(12) United States Patent
Ando et al.

(10) Patent No.: US 7,970,541 B2
(45) Date of Patent: Jun. 28, 2011

(54) NAVIGATION DEVICE AND MAP SCROLL PROCESSING METHOD

(75) Inventors: Yuichi Ando, Kanagawa (JP); Satoshi Yamazaki, Kanagawa (JP)

(73) Assignee: Sony Corporation, Tokyo (JP)

( * ) Notice: Subject to any disclaimer, the term of this patent is extended or adjusted under 35 U.S.C. 154(b) by 626 days.

(21) Appl. No.: 12/123,096

(22) Filed: May 19, 2008

(65) Prior Publication Data

US 2008/0306683 A1  Dec. 11, 2008

(30) Foreign Application Priority Data

Jun. 7, 2007  (JP) ................................. 2007-151770

(51) Int. Cl.
*G06F 19/00* (2006.01)
*G06F 3/041* (2006.01)
*G09G 5/00* (2006.01)

(52) U.S. Cl. ........ 701/213; 701/201; 701/211; 345/581; 345/619; 345/687

(58) Field of Classification Search .................. 701/213, 701/201, 211; 345/581, 619, 687
See application file for complete search history.

(56) References Cited

U.S. PATENT DOCUMENTS

| | | | | |
|---|---|---|---|---|
| 6,122,592 A * | 9/2000 | Arakawa et al. | ............... | 701/201 |
| 7,307,643 B2 * | 12/2007 | Moroo et al. | ................. | 345/667 |
| 7,405,739 B2 * | 7/2008 | Gannon | ......................... | 345/660 |
| 7,689,934 B2 * | 3/2010 | Neervoort | ...................... | 715/847 |
| 7,852,357 B2 * | 12/2010 | Kato | .............................. | 345/660 |
| 2007/0226646 A1 * | 9/2007 | Nagiyama et al. | ............. | 715/784 |
| 2008/0129712 A1 * | 6/2008 | Nguyen | .......................... | 345/179 |
| 2009/0109245 A1 * | 4/2009 | Han | ............................... | 345/684 |

FOREIGN PATENT DOCUMENTS

| | | |
|---|---|---|
| JP | 7-210137 | 8/1995 |
| JP | 2000-29382 | 1/2000 |
| JP | 2002-122441 | 4/2002 |
| JP | 2005-92538 | 4/2005 |
| JP | 2006-214980 | 8/2006 |
| JP | 2007-102000 | 4/2007 |

* cited by examiner

*Primary Examiner* — Ronnie Mancho
(74) *Attorney, Agent, or Firm* — Oblon, Spivak, McClelland, Maier & Neustadt, L.L.P.

(57) ABSTRACT

A navigation device that obtains the current position based on information from a satellite, and guides a travel path from the current position to the destination on a map image includes: a display unit that displays the map image; a touch sensor unit that is arranged on the front surface of the display unit; an icon generation unit that generates a smooth scroll operation icon which is available for continuous performs smooth scroll processing for the map image and displays the smooth scroll operation icon on the map image; and a scroll control unit that executes the smooth scroll processing when the touch sensor unit detects that the smooth scroll operation icon is touched to be operated, and executes a predetermined scroll processing when the touch sensor unit detects that a region other than the smooth scroll operation icon is touched to be operated on the screen of the display unit.

9 Claims, 7 Drawing Sheets

NAVIGATION DEVICE AND MAP SCROLL PROCESSING METHOD

CROSS REFERENCES TO RELATED APPLICATIONS

The present invention contains subject matter related to Japanese Patent Application JP2007-151770 filed in the Japanese Patent Office on Jun. 7, 2007, the entire contents of which being incorporated herein by reference.

BACKGROUND OF THE INVENTION

1. Field of the Invention

This invention relates to a navigation device and a map scroll processing method which are desirably applied to a portable navigation device (Hereinafter, referred to as PND).

2. Description of the Related Art

In Europe and North America, the utilization of a personal navigation device (PND) of a small screen size which can be easily attached and detached is increasing. In the PND, in a state in which a map image is displayed on the screen, the map image can be scrolled when the user directly touches and traces the screen with the fingertip, and various scroll operation units are provided for respective products.

Furthermore, there has been suggested a screen display control device for navigation (for example, refer to Jpn. Pat. Appln. Laid-Open Publication No. H07-210137) in which a map image is touched to be scrolled such that a position detected by a touch sensor is set to the screen center, and a map display device (for example, refer to Jpn. Pat. Appln. Laid-Open Publication No. 2002-323850) in which, when a touch sensor panel is pressed to be scrolled, a map is touched to be scrolled such that a position pressed on the touch sensor panel is set to the display screen center, and, when the pressing operation is continued, the map image is continuously and smoothly scrolled in the display screen center direction from the pressed position until the pressing operation is released.

SUMMARY OF THE INVENTION

Meanwhile, in thus configured PND, while it is easy to scroll and display the periphery of the current position according to the drag scroll operation by the user, in case the user wants to display a map image of a point distant from the current position, it is necessary to make the user perform the smooth scroll operation.

Under the smooth scroll operation method, for example, the user keeps touching an arbitrary point on the screen with the fingertip for a predetermined time period or more, and the PND comes into the smooth scroll processing (at the time of the touch scroll operation under which the user keeps touching an arbitrary point for a predetermined time period or less, the PND comes into the touch scroll processing under which the touched point is made to shift to the screen center).

However, the difference between the smooth scroll operation and the touch scroll operation by the user is the difference of time period for which the user keeps touching an arbitrary point on the screen with the fingertip, and these operations are similar to each other. Accordingly, there may be often raised a situation in which, even if the user himself intends to perform the smooth scroll operation, the touch scroll operation is actually performed and the PND undesirably comes into the touch scroll processing, or, even if the user himself intends to perform the touch scroll operation, the smooth scroll operation is actually performed and the PND undesirably comes into the smooth scroll processing, and the operability is bad.

In the PND, in case of executing the smooth scroll processing by employing a method other than the scroll operation with respect to the touch panel on the screen, it is necessary to make the user, after changing the scale of a map image using an input means such as a remote controller, perform the smooth scroll operation through the remote controller, which forces the user to perform a troublesome operation using the remote controller.

In view of the above-identified circumstances, it is therefore desirable to provide a navigation device and a map scroll processing method which can execute the scroll processing desired by the user easily by only making the user perform the touch operation.

According to an embodiment of the present invention, when obtaining the current position based on information from a satellite, and guiding a travel path from the current position to the destination on a map image, a smooth scroll operation icon which is available for continuous smooth scroll processing on the map image displayed on a display means is generated and displayed on the map image. When it is detected that the smooth scroll operation icon is touched to be operated, the smooth scroll processing is executed, and, when it is detected that a region other than the smooth scroll operation icon is touched to be operated on the screen of the display means, a predetermined scroll processing is executed. Accordingly, since the user can perform the selection operation in a state in which the continuous smooth scroll processing and predetermined scroll processing are sectionalized on the map image, it becomes possible to execute the continuous smooth scroll processing and predetermined scroll processing on which the will of the user is faithfully reflected by only making the user perform the touch operation with respect to the screen of the display means.

Accordingly, it becomes possible to realize a navigation device and a map scroll processing method which can execute the scroll display desired by the user easily by only making the user perform the touch operation.

The nature, principle and utility of the invention will become more apparent from the following detailed description when read in conjunction with the accompanying drawings in which like parts are designated by like reference numerals or characters.

DETAILED DESCRIPTION OF THE PREFERRED EMBODIMENTS

Now, embodiments of the present invention will be described in greater detail by referring to the accompanying drawings.

(1) External Configuration of PND

Figure 1:
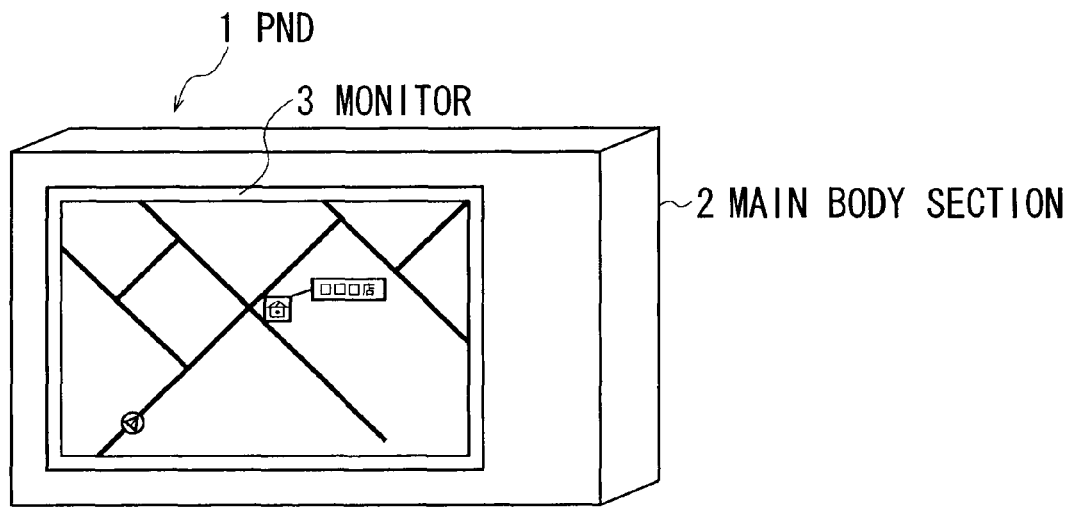
FIG. 1 shows a schematic perspective view indicative of an external configuration of a PND.

In FIG. 1, a reference numeral 1 represents a PND which is portable and can be carried about, and is mainly used in a vehicle. The PND 1 has a rectangular main body section 2, and a monitor 3 arranged on the front surface of the main body section 2, and generates a map image or the like according to map data stored in a nonvolatile memory, a hard disc and the like built in the main body section 2, and displays the map image on the monitor 3.

(2) Hardware Configuration of PND

Figure 2:
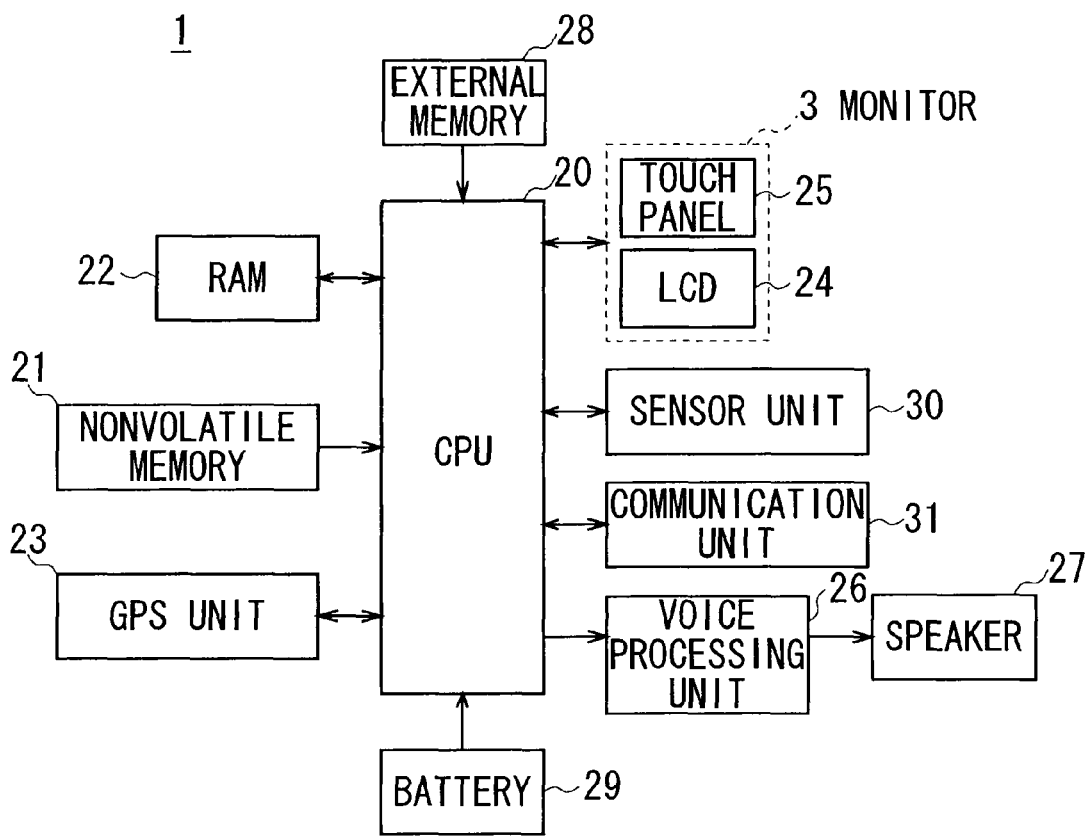
FIG. 2 shows a schematic block diagram indicative of a circuit configuration of the PND.

As shown in FIG. 2, the PND 1 is operated by power supplied from a battery 29, and a central processing unit (CPU) 20 controls the entire operation. By reading out a basic program or various application programs stored in a nonvolatile memory 21 and executing the programs on a random access memory (RAM) 22, the PND 1 realizes the general navigation function and nearest point search processing function which will to be described later.

In the PND 1, map data indicative of a map of the entire country is stored in the nonvolatile memory 21 such as a static random access memory (SRAM), a flash memory backed up by the battery 29, and point of interest (POI) data representing the interest points such as facilities is stored such that the points correspond to positions on the map.

The PND 1 has an external memory 28 that is, for example, an optical disc such as a compact disc-read only memory (CD-ROM), a digital versatile disc-read only memory (DVD-ROM), and a hard disc drive, and high-capacity data such as the map data, POI data, contents data of search information or music/video can be stored.

Furthermore, by receiving an electric wave from a global positioning system (GPS) satellite using a GPS unit 23, the PND 1 calculates GPS information including the latitude, longitude, altitude, and the like, all the time, and sends the GPS information to the CPU 20.

By comparing the GPS information supplied from the GPS unit 23 and the map data stored in the nonvolatile memory 21, the CPU 20 of the PND 1 reads out map data of a predetermined range including a position where the PND 1 exists at the present moment (that is, vehicle position where vehicle to which the PND 1 is mounted exists), and displays a map image of a predetermined magnification ratio representing the vehicle position and the periphery thereof on a liquid crystal display (LCD) 24 of the monitor 3 according to the map data.

Furthermore, according to the user operation with respect to a touch panel 25 arranged on the surface of the LCD 24 of the monitor 3, in case POI data is arbitrarily selected as the destination, the CPU 20 of the PND 1 searches the approaching path or the like to the destination corresponding to the POI data from the vehicle position of a vehicle, and generates an navigation map image representing the approaching path to display the navigation map image on the LCD 24.

At this time, the CPU 20 of the PND 1 displays the navigation map image representing the accession path on the LCD 24, and, while the vehicle is traveling to the destination in accordance with the approaching path through a voice processing unit 26, generates voice information to guide and aid the driving of the user (hereinafter, this is referred to as navigate), and outputs a navigate voice from a speaker 27.

In this way, the PND 1 can provide a navigation function to navigate the vehicle to the destination desired by the user.

Furthermore, the PND 1 has a sensor unit 30 including a vehicle speed sensor which detects the wheel rotation number of the vehicle, a vibration gyro sensor which detects the rotational angular speed of the vehicle body, an acceleration sensor which detects the acceleration of the vehicle, a vibration sensor which detects the vibration of the vehicle, a parking brake switch detection sensor which detects the state of the traveling device of the vehicle, a brake lamp switch detection sensor, a steering rudder angle sensor, and a throttle opening sensor. The vehicle position can be detected more accurately based on the detection result of the sensor unit 30 and GPS information of the GPS unit 23.

(3) Software Functional Block Configuration Realizing Map Scroll Processing Function by PND Next, a software function block in which, in accordance with a basic program or various application programs, the CPU 20 of the PND 1 accepts the scroll operation from the user and performs the scroll processing for a navigation map image displayed on the LCD 24 of the monitor 3 will be explained.

Figure 3:
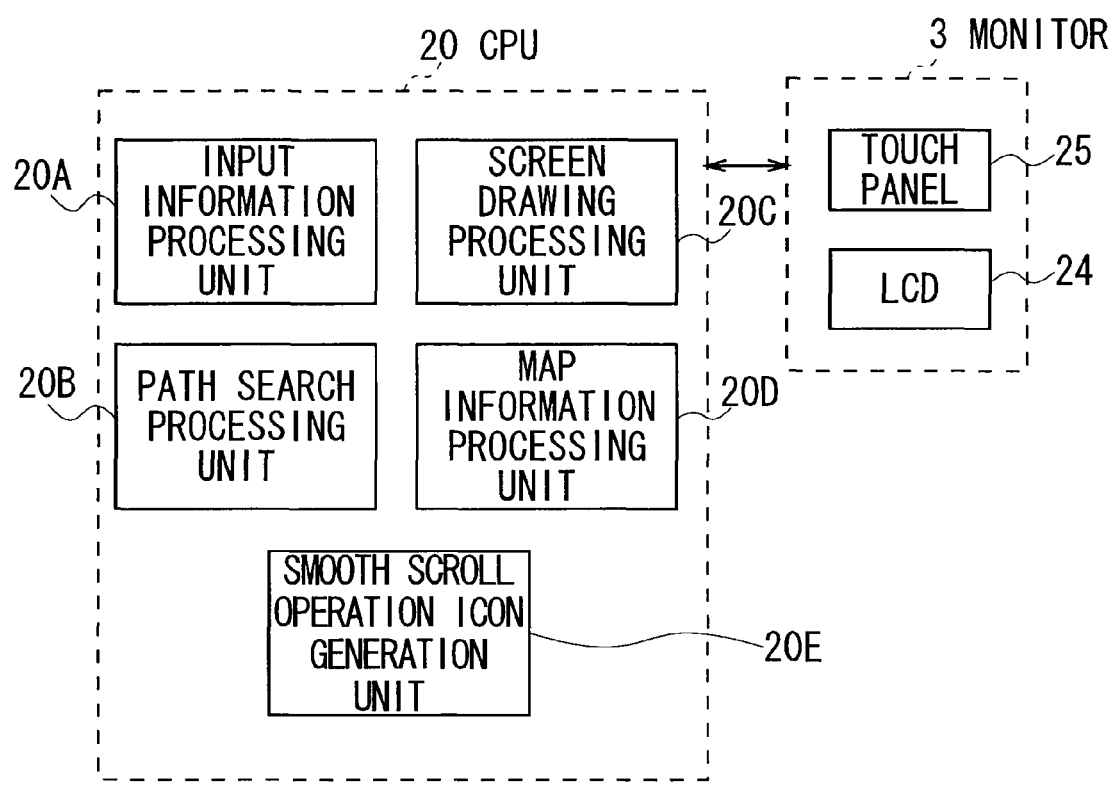
FIG. 3 shows a schematic block diagram indicative of a functional block of scroll processing.

As shown in FIG. 3, the CPU 20 of the PND 1 accepts the touch operation by the fingertip of the user with respect to the touch panel 25 of the monitor 3 using an input information processing unit 20A, and calculates a display position with respect to the LCD 24 of the map image according to the touch operation.

At this time, the CPU 20 of the PND 1 reads out map data which is original data of a map image from the nonvolatile memory 21 (FIG. 2) or external memory 28, and a map information processing unit 20D converts the map data to a structure which can be drawn on the LCD 24, and a path search processing unit 20B obtains the approaching path from the vehicle position calculated based on the GPS information from the GPS unit 23 to the destination.

The CPU 20 of the PND 1 generates a navigation map image to perform the route guide using a screen drawing processing unit 20C based on various information, or the display position with respect to the LCD 24 of the map image, map data of a predetermined range corresponding to the map image which should be displayed on the display position, approaching path, and the like, displays the navigation map image on the LCD 24 of the monitor 3, and executes the scroll processing according to the scroll operation by the user.

In this way, in a state in which the navigation map image is displayed on the LCD 24 of the monitor 3, when detecting that the touch scroll operation or drag scroll operation is performed by the fingertip of the user using the touch panel 25, the CPU 20 of the PND 1 performs the scroll processing for the navigation map image according to the scroll operation.

The CPU 20 of the PND 1 generates a smooth scroll operation icon (to be described later) which is available for continuous smooth scroll processing for the navigation map image according to the touch operation by the fingertip of the user using a smooth scroll operation icon generation unit 20E, and overlaps and displays the smooth scroll operation icon on the navigation map image.

(4) Scroll Processing

Next, various scroll processing (touch scroll processing, drag scroll processing, and smooth scroll processing) to be performed by the CPU 20 of the PND 1 will be specifically explained.

(4-1) Touch Scroll Processing

Figure 4:
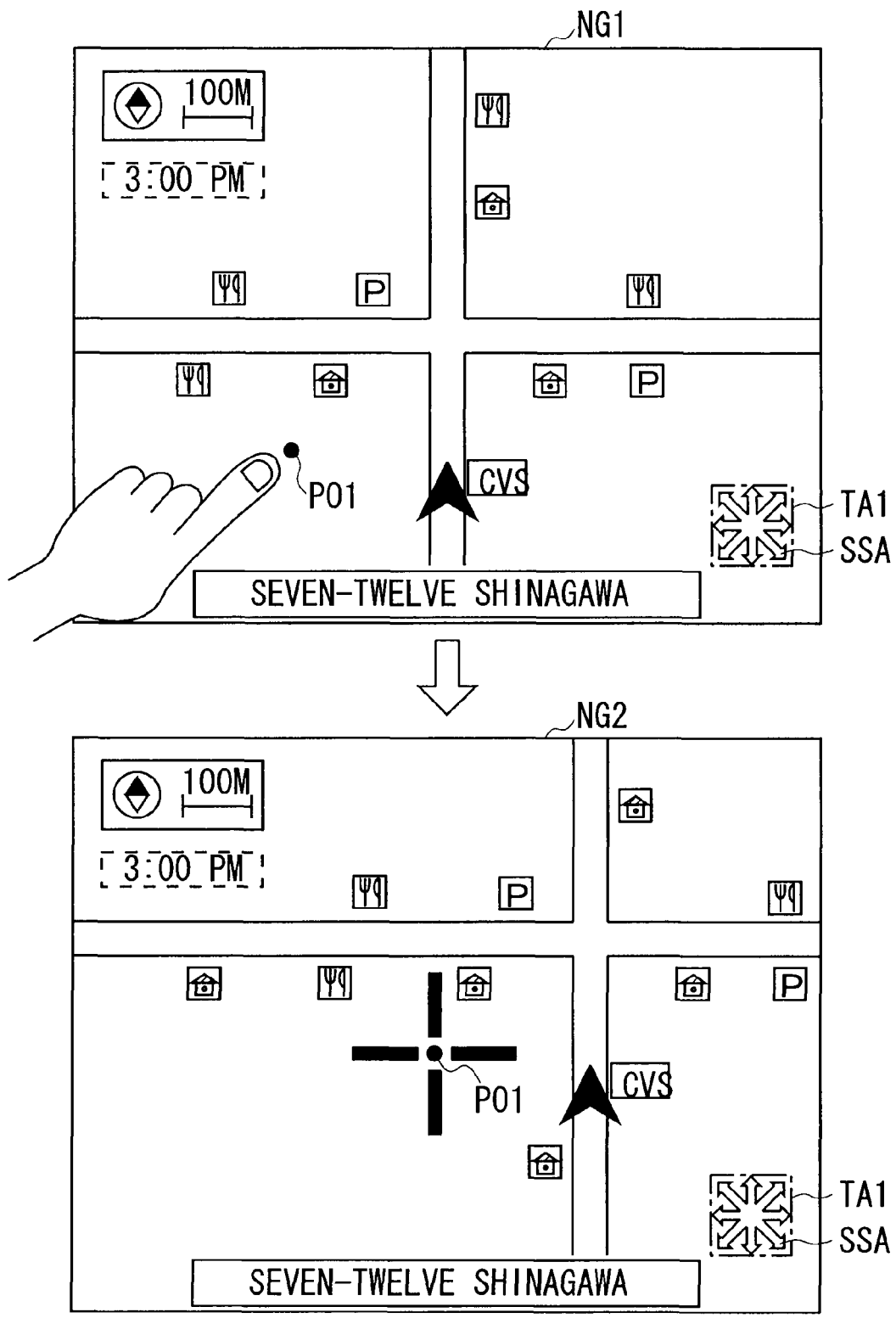
FIG. 4 shows a schematic view to explain touch scroll processing.

As shown in FIG. 4, in a state in which a navigation map image NG1 is displayed on the LCD 24 of the monitor 3, when an arbitrary point PO1 on the screen of the LCD 24 is touched to be operated by the fingertip of the user, by executing the touch scroll processing under which the point PO1 is shifted to the screen center of the LCD 24, the CPU 20 of the PND 1 displays a navigation map image NG2 which has its display region shifted.

That is, when it is recognized that the arbitrary point PO1 of the navigation map image NG1 displayed on the LCD 24 is touched to be operated by the user, by displaying the navigation map image NG2 having a display region in which the point PO1 is set to the screen center on the LCD 24, the CPU 20 of the PND 1 can execute the touch scroll processing under which the display contents of the LCD 24 are instantaneously switched.

(4-2) Drag Scroll Processing

Figure 5:
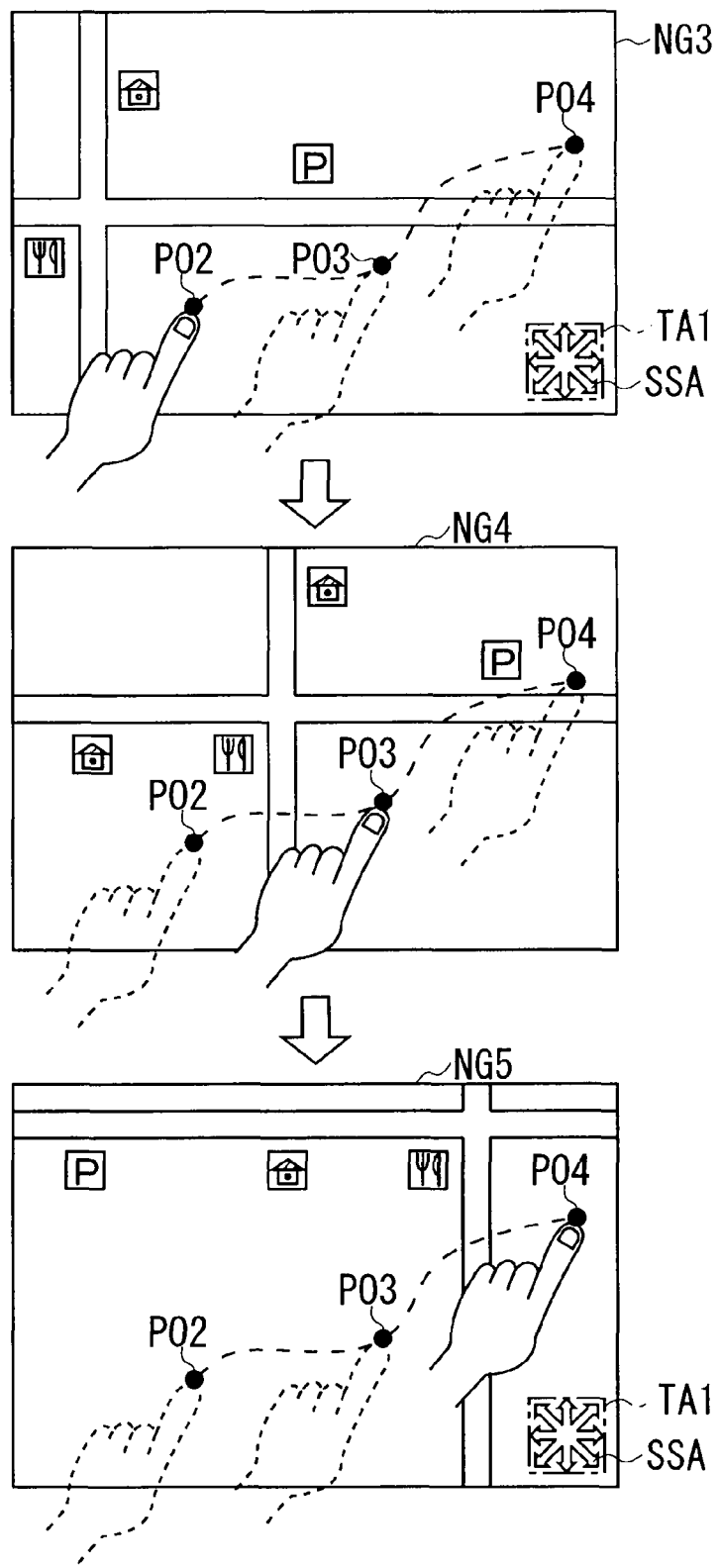
FIG. 5 shows a schematic view to explain drag scroll processing.

As shown in FIG. 5, in a state in which a navigation map image NG3 is displayed on the LCD 24 of the monitor 3, when an arbitrary point PO2 on the screen of the LCD 24 is touched to be operated by the fingertip of the user, and the fingertip traces the point PO2 to the point PO3, PO4 with the point touched by the fingertip, the CPU 20 of the PND 1 displays navigation map images NG4, NG5 in which the map is shifted toward the PO2 to PO4 in series according to the trajectory of the drag scroll operation.

That is, when it is recognized that the drag scroll operation is performed under which the arbitrary point PO2 of the navigation map image NG3 displayed on the LCD 24 is touched to be operated by the fingertip and is traced on the screen, by performing the drag scroll operation in a direction along the trajectory of the drag scroll operation and displaying in series the navigation map images NG4, NG5 which have their display region of the map shifted, the CPU 20 of the PND 1 can execute the drag scroll processing under which the map of the LCD 24 is gradually shifted and displayed.

(4-3) Smooth Scroll Processing

Figure 6:
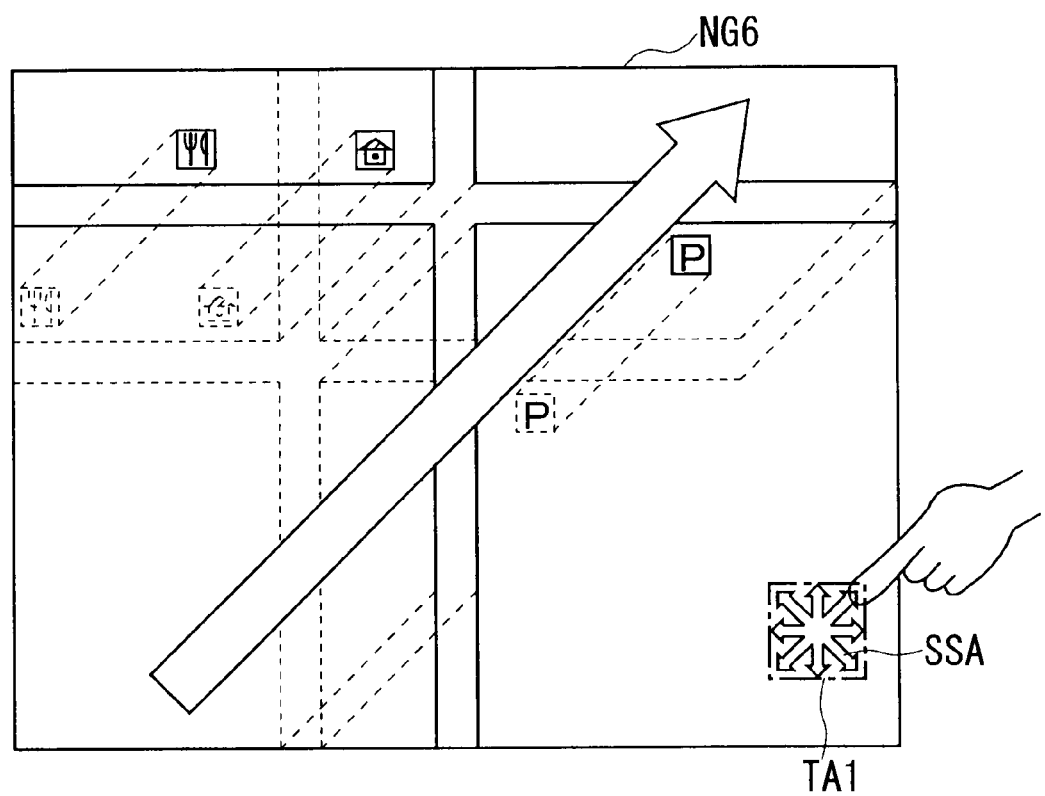
FIG. 6 shows a schematic view to explain smooth scroll processing.

As shown in FIG. 6, the CPU 20 of the PND 1 arranges a smooth scroll operation icon SSA according to a vehicle of the right-hand drive specification on the right corner of a navigation map image NG6 displayed on the LCD 24, and when an arrow part representing a predetermined direction of the smooth scroll operation icon SSA is touched to be operated by the fingertip of the user, during a time period for which the user keeps on touching and operating the arrow part, the navigation map image is shifted with a high speed in the arrow direction.

That is, of the smooth scroll operation icon SSA arranged on the right corner of the navigation map image NG6, by a time period for which the arrow part of a predetermined direction along which the user desires the smooth scroll processing is touched to be operated by the fingertip of the user, the CPU 20 of the PND 1 can perform the smooth scroll processing by shifting the map image in the arrow direction with a high speed. Accordingly, without changing the scale size of the map, or with the same scale size, a map of a point distant from a region displayed on the navigation map image NG6 can be displayed in a small amount of time.

Figure 7A:
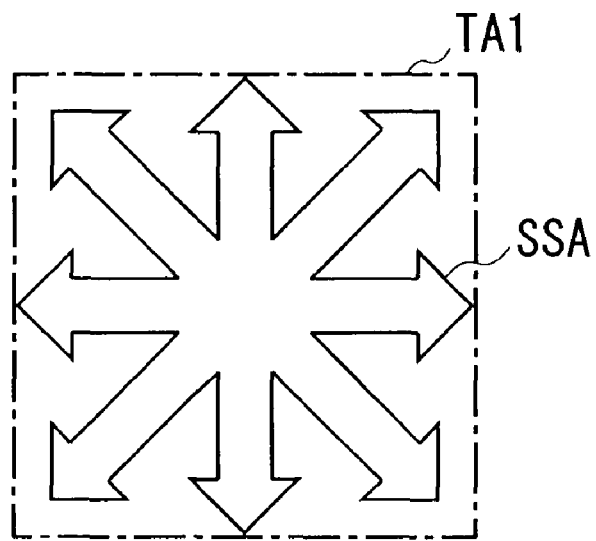
FIG. 7A and FIG. 7B show schematic views indicative of the display figuration of a smooth scroll operation icon and a touch region.

As shown in FIG. 7A, the smooth scroll operation icon SSA has, in addition to arrow parts of the back and forth, and right and left directions, arrow parts of oblique upper right, oblique lower right, oblique upper left, oblique lower left directions, and a touch region TA1 in the form of a rectangle to determine whether or not the touch operation is performed is formed around the arrow parts.

Accordingly, of the arrow parts of the back and forth, and right and left directions, and the arrow parts of the oblique upper right, oblique lower right, oblique upper left, oblique lower left directions of the smooth scroll operation icon SSA, when the touch panel 25 detects that an arrow part representing any one of the directions is touched to be operated by the fingertip of the user, by supplying the detection result to the CPU 20, the PND 1 can make the CPU 20 determine the direction of the smooth scroll processing.

Figure 7B:
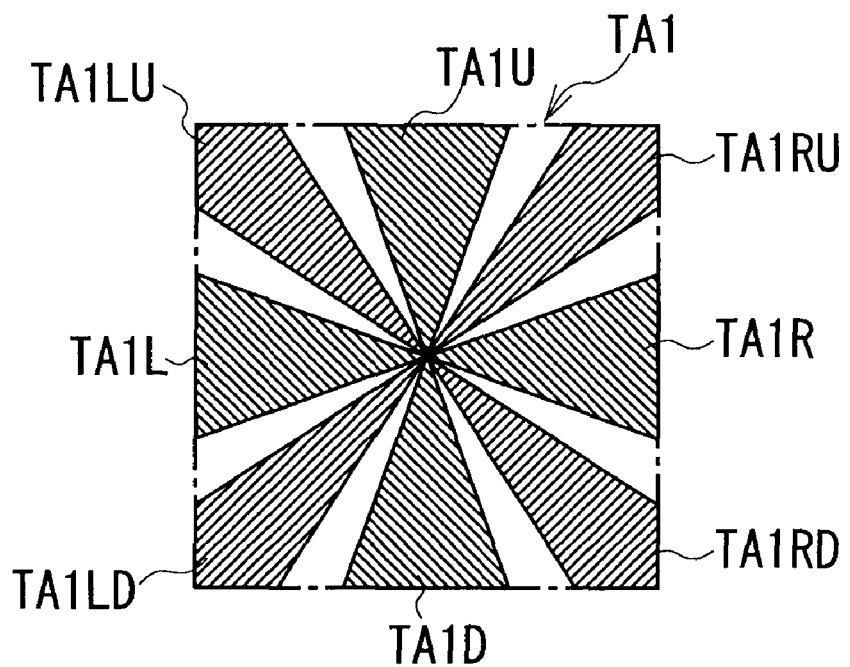

On the other hand, in the PND 1, the size of the smooth scroll operation icon SSA is not necessarily larger than the fingertip of the user, and, considering that an error in touch operation is raised, as shown in FIG. 7B, the touch panel 25 detects that an upper direction region TA1U, a lower direction region TA1D, a right direction region TA1R, a left direction region TA1L, an oblique upper right direction region TA1RU, an oblique lower right direction region TA1RD, an oblique upper left direction region TA1LU, and an oblique lower left direction region TA1LD, which are sectioned by diagonal line parts of predetermined width in the touch region TA1, are touched to be operated, and the detection result is supplied to the CPU 20. Accordingly, the CPU 20 can determine the direction of the smooth scroll processing.

Accordingly, in the PND 1, since the touch panel 25 detects the touch operation with respect to the upper direction region TA1U, lower direction region TA1D, right direction region TA1R, left direction region TA1L, oblique upper right direction region TA1RU, oblique lower right direction region TA1RD, oblique upper left direction region TA1LU, and oblique lower left direction region TA1LD, which spread as they proceed from the center to the circumference of the touch region TA1, a situation in which the size of the smooth scroll operation icon SSA is not necessarily larger than the fingertip of the user, and an error in touch operation is easily raised can be prevented.

The CPU 20 of the PND 1 displays the smooth scroll operation icon SSA on the right corner of the navigation map image NG6. At this time, the touch region TA1, and its upper direction region TA1U, lower direction region TA1D, right direction region TA1R, left direction region TA1L, oblique upper right direction region TA1RU, oblique lower right direction region TA1RD, oblique upper left direction region TA1LU, and oblique lower left direction region TA1LD are not displayed, which gives an impression of executing the smooth scroll processing when the arrow part of the smooth scroll operation icon SSA is touched to be operated to the user.

The CPU 20 of the PND 1 displays the smooth scroll operation icon SSA on the navigation map image NG1 (FIG. 4) and on the navigation map image NG3 (FIG. 5), and based on whether or not the smooth scroll operation icon SSA of the navigation map images NG1, NG3 is selected, whether or not the user is made to execute the touch scroll operation or drag scroll operation, or whether or not the user is made to execute the smooth scroll operation can be easily determined.

(5) Map Scroll Processing Procedure

Figure 8:
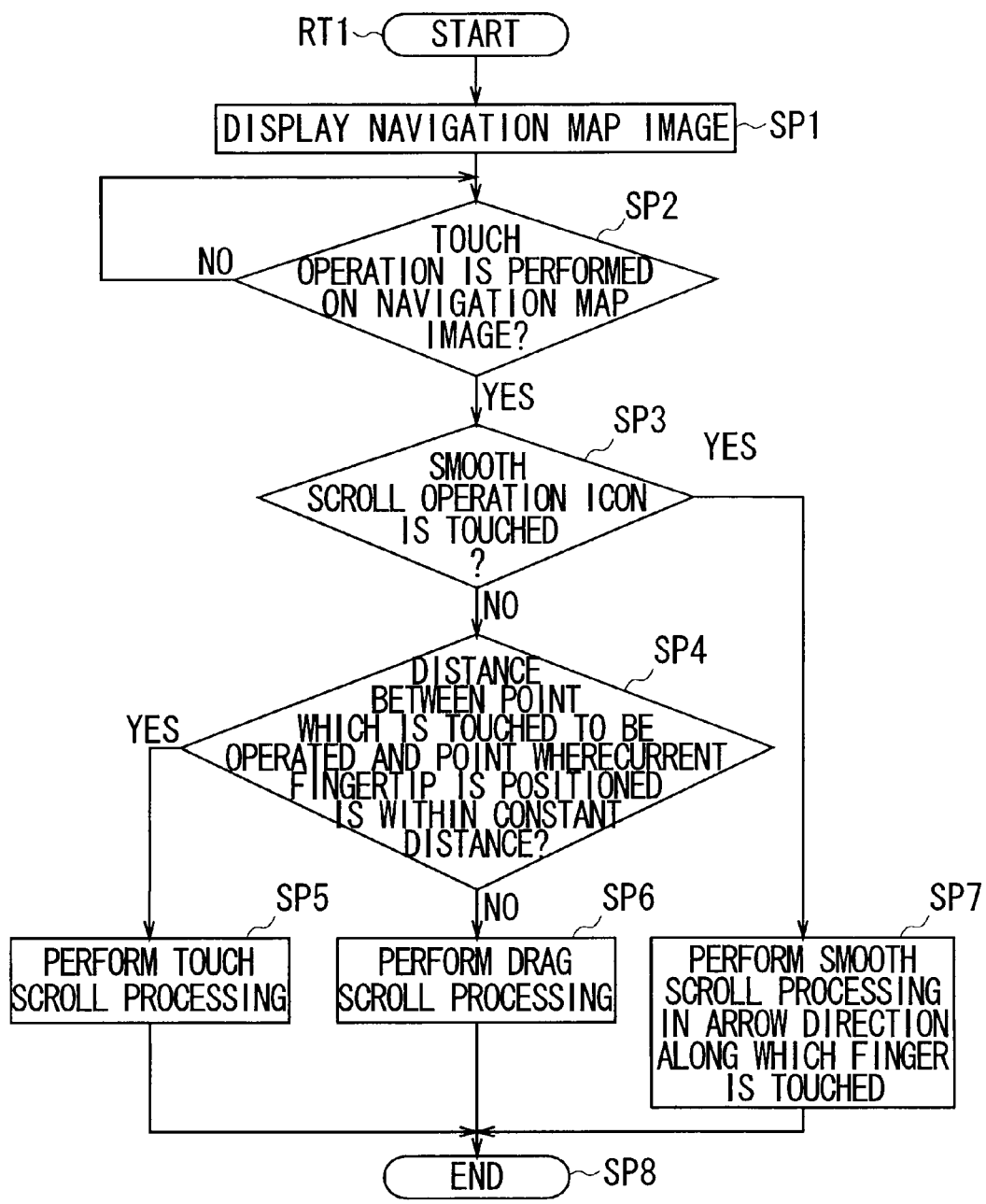
FIG. 8 shows a flowchart indicative of map scroll processing procedure.

Next, the map scroll processing procedure that performs the scroll processing for a navigation map image according to the scroll operation by the user will be explained referring to a flowchart shown in FIG. 8.

Actually, in accordance with a map scroll processing program which is an application program launched on the RAM 22 from the nonvolatile memory 21, the CPU 20 of the PND 1 starts the routine RT1 from the start step, and goes to the next step SP1, and displays the navigation map image NG1, NG3, or NG6 including the approaching path to the destination set by the user on the LCD 24 of the monitor 3, and goes to the next step SP2.

In step SP2, the CPU 20 of the PND 1 determines whether or not the touch operation by the fingertip of the user is performed with respect to the navigation map image NG1, NG3, or NG6 displayed on the LCD 24. In case the negative result is obtained, the processing returns to step SP2 again to wait until the touch operation is performed, while in case the positive result is obtained, the processing goes to step SP3.

In step SP3, the CPU 20 of the PND 1 determines whether or not the smooth scroll operation icon SSA arranged on the right corner of the navigation map image NG1, NG3, or NG6 displayed on the LCD 24 is touched to be operated by the fingertip of the user.

In case the negative result is obtained, this represents that the smooth scroll operation icon SSA is not touched to be operated, and an arbitrary point excluding the smooth scroll operation icon SSA on the navigation map image NG1, NG3, or NG6 is touched to be operated, and the CPU 20 of the PND 1 goes to step SP4.

In step SP4, the CPU 20 of the PND 1 determines, excluding the smooth scroll operation icon SSA on the navigation map image NG6, whether or not the distance between the point which is touched to be operated by the fingertip of the user and a point where the current fingertip is positioned is within a constant distance. It is determined that the touch scroll operation is performed in case the positive result is obtained, and the processing goes to next step SP5.

In step SP5, the CPU 20 of the PND 1 executes the touch scroll processing (FIG. 4) according to the touch scroll operation of the user, and the processing goes to step SP8 to end the processing.

On the other hand, in case the negative result is obtained in step SP4, it is determined that the distance between the point which is touched to be operated by the fingertip of the user and a point where the current fingertip is positioned is over a constant distance, that is, the drag scroll operation is performed, and the CPU 20 of the PND 1 goes to the next step SP6.

In step SP6, the CPU 20 of the PND 1 executes the drag scroll processing (FIG. 5) according to the drag scroll operation of the user, and the processing goes to the next step SP8 to end the processing.

On the other hand, in case the positive result is obtained in step SP3, it is determined that the smooth scroll operation icon SSA is touched to be operated, and the user wants to perform the smooth scroll processing in an arrow direction of the arrow part of the smooth scroll operation icon SSA which is touched to be operated, and the CPU 20 of the PND 1 goes to the next step SP7.

In step SP7, the CPU 20 of the PND 1 executes the smooth scroll processing (FIG. 6) in a direction corresponding to the arrow part (actually, any one of the upper direction region TA1U, lower direction region TA1D, right direction region TA1R, left direction region TA1L, oblique upper right direction region TA1RU, oblique lower right direction region TA1RD, oblique upper left direction region TA1LU, and oblique lower left direction region TA1LD) of the smooth scroll operation icon SSA which is touched to be operated by the fingertip of the user, and the processing goes to the next step SP8 to end the processing.

(6) Operation and Effect

In above described configuration, on the navigation map image NG1, NG3, or NG6 displayed on the LCD 24 of the monitor 3, since the smooth scroll operation icon SSA is arranged on the right corner thereof, when the arrow part of the smooth scroll operation icon SSA is touched to be operated by the fingertip of the user, during a time period for which the user keeps on touching and operating the arrow part, the CPU 20 of the PND 1 can make the user viscerally image that the smooth scroll processing under which the navigation map image NG6 is shifted in an arrow direction of the arrow part with a high speed is performed.

Furthermore, in case part other than the region of the smooth scroll operation icon SSA arranged on the right corner of the navigation map image NG1, NG3, or NG6 is touched to be operated by the fingertip of the user, as has been performed in the past, the CPU 20 of the PND 1 can make the user image that the touch scroll processing or drag scroll processing is performed.

That is, since the CPU 20 of the PND 1 can make the user visually confirm the display state in which, on the navigation map image NG1, NG3, or NG6, the smooth scroll operation icon SSA to execute the smooth scroll processing and the part other than the region of the smooth scroll operation icon SSA to execute the touch scroll processing or drag scroll processing are sectionalized, the scroll processing of a kind which is desired by the user can be correctly specified.

Furthermore, without making the user perform the screen switch operation such as switching the scale size of the navigation map image NG1, NG3, or NG6, by making the user touch the smooth scroll operation icon SSA or the other region on the screen, the CPU 20 of the PND 1 can execute the smooth scroll processing, touch scroll processing, or drag scroll processing on which the will of the user is correctly reflected.

In the above-described configuration, by making the user perform the easy touch operation on the screen of the navigation map image NG1, NG3, or NG6, the CPU 20 of the PND 1 can execute all the scroll processing desired by the user on the same screen, which can reduce the stress of the user due to a troublesome operation and further improve the operability.

(7) Other Embodiments

In above-described embodiment, the smooth scroll operation icon SSA is arranged on the right corner of the navigation map image NG1, NG3, or NG6 according to the right-hand drive vehicle, to which the present invention is not restricted. The smooth scroll operation icon SSA may be arranged on the left corner of the navigation map image NG1, NG3, or NG6 according to the left-hand drive vehicle.

Furthermore, in the above-described embodiment, the present invention is applied to the PND 1 which is portable and can be carried about, and is mainly used in a vehicle, to which the present invention is not restricted. The present invention may be applied to a fixed type vehicle navigation device that is fixed to a vehicle.

Furthermore, in the above-described embodiment, the smooth scroll processing is executed during a time period for which the user keeps on touching and operating the smooth scroll operation icon SSA, to which the present invention is not restricted. There may be employed a configuration in which the smooth scroll processing is started when it is detected that the smooth scroll operation icon SSA is touched to be operated once, and the smooth scroll processing is stopped when it is detected that the smooth scroll operation icon SSA is touched to be operated again.

Furthermore, in the above-described embodiment, the CPU 20 of the PND 1 executes the above-described map scroll processing procedure in accordance with a map scroll processing program stored in the nonvolatile memory 21, to which the present invention is not restricted. The CPU 20 of the PND 1 may execute the above-described map scroll processing procedure in accordance with a map scroll processing program installed from a recording medium, a map scroll processing program downloaded from the Internet, or a map scroll processing program installed through other various routes.

Furthermore, in the above-described embodiment, the LCD 24 as display unit, touch panel 25 as touch sensor unit, and CPU 20 as icon generation unit and scroll control unit configure the PND 1 as the navigation device of the present invention, to which the present invention is not restricted. The navigation device may be configured by a display unit, touch sensor unit, icon generation unit, and scroll control unit of other various circuit configurations.

The navigation device and map scroll processing method according to the embodiments of the present invention can be applied not only to a vehicle navigation device such as the PND but also to other various electronic devices such as a notebook type personal computer provided with the navigation function, a game machine provided with the navigation function, and a cellular phone provided with the navigation function.

It should be understood by those skilled in the art that various modifications, combinations, sub-combinations and alterations may occur depending on design requirements and other factors insofar as they are within the scope of the appended claims or the equivalents thereof.

What is claimed is:

1. A navigation device that obtains the current position based on information from a satellite, and guides a travel path from the current position to the destination on a map image, comprising:
    display means for displaying the map image;
    touch sensor means arranged on the front surface of the display means;
    icon generation means for generating a smooth scroll operation icon which is available for continuous smooth scroll processing for the map image and displaying the smooth scroll operation icon on the map image; and
    scroll control means for executing the smooth scroll processing when the touch sensor means detects that the smooth scroll operation icon is touched to be operated and for executing a predetermined scroll processing when the touch sensor means detects that a region other than the smooth scroll operation icon is touched to be operated on the screen of the display means.

2. The navigation device according to claim 1, wherein when a region other than the smooth scroll operation icon is touched to be operated on the screen of the display means, the scroll control means performs touch scroll processing in case the distance between the point which is touched to be operated and a point which is currently touched to be operated is within a constant distance, and performs drag scroll processing in case the distance between the point which is touched to be operated and a point which is currently touched to be operated is over a constant distance.

3. The navigation device according to claim 1, wherein the icon generation means generates the smooth scroll operation icon representing the back and forth, and right and left directions, and oblique upper right, oblique lower right, oblique upper left, and oblique lower left directions, and displays the smooth scroll operation icon on the map image.

4. The navigation device according to claim 1, wherein the icon generation means displays the smooth scroll operation icon on the lower right or lower left of the map image according to the position of the driver's seat.

5. A map scroll processing method for a navigation device that obtains the current position based on information from a satellite, and guides a travel path from the current position to the destination on a map image, comprising:
    an icon generation step of generating a smooth scroll operation icon which is available for continuous smooth scroll processing on the map image displayed on display means using predetermined icon generation means, and displaying the smooth scroll operation icon on the map image; and
    scroll control step of executing the smooth scroll processing using predetermined scroll control means when the touch sensor means arranged on the front surface of the display means detects that the smooth scroll operation icon is touched to be operated, and of executing a predetermined scroll processing using the scroll control means when the touch sensor means detects that a region other than the smooth scroll operation icon is touched to be operated on the screen of the display means.

6. The map scroll processing method according to claim 5, wherein
    when a region other than the smooth scroll operation icon is touched to be operated on the screen of the display means, the scroll control step performs touch scroll processing in case the distance between the point which is touched to be operated and a point which is currently touched to be operated is within a constant distance, and performs drag scroll processing in case the distance between the point which is touched to be operated and a point which is currently touched to be operated is over a constant distance.

7. The map scroll processing method according to claim 5, wherein
    the icon generation step generates the smooth scroll operation icon representing the back and forth, and right and left directions, and oblique upper right, oblique lower right, oblique upper left, and oblique lower left directions, and displays the smooth scroll operation icon on the map image.

8. The map scroll processing method according to claim 5, wherein
    the icon generation step displays the smooth scroll operation icon on the lower right or lower left of the map image according to the position of the driver's seat.

9. A navigation device that obtains the current position based on information from a satellite, and guides a travel path from the current position to the destination on a map image, comprising:
    a display unit that displays the map image;
    a touch sensor unit that is arranged on the front surface of the display unit;
    an icon generation unit that generates a smooth scroll operation icon which is available for continuous smooth scroll processing for the map image and displays the smooth scroll operation icon on the map image; and
    a scroll control unit that executes the smooth scroll processing when the touch sensor unit detects that the smooth scroll operation icon is touched to be operated, and executes a predetermined scroll processing when the touch sensor unit detects that a region other than the smooth scroll operation icon is touched to be operated on the screen of the display unit.

* * * * *